(12) United States Patent
Madani

(10) Patent No.: US 7,810,735 B2
(45) Date of Patent: Oct. 12, 2010

(54) COMPUTER READABLE UNIVERSAL AUTHORIZATION CARD SYSTEM AND METHOD FOR USING SAME

(75) Inventor: Masih Madani, Van Nuys, CA (US)

(73) Assignee: Inadam Corporation, Las Vegas, NV (US)

( * ) Notice: Subject to any disclaimer, the term of this patent is extended or adjusted under 35 U.S.C. 154(b) by 685 days.

(21) Appl. No.: 11/788,732

(22) Filed: Apr. 19, 2007

(65) Prior Publication Data

US 2007/0257107 A1 Nov. 8, 2007

Related U.S. Application Data

(63) Continuation-in-part of application No. 10/145,650, filed on May 15, 2002, now Pat. No. 7,299,980.

(60) Provisional application No. 60/291,180, filed on May 15, 2001.

(51) Int. Cl.
*G06K 19/00* (2006.01)

(52) U.S. Cl. ........................ 235/487; 235/375

(58) Field of Classification Search ................ 235/487, 235/493, 494, 491, 375
See application file for complete search history.

(56) References Cited

U.S. PATENT DOCUMENTS

| | | | |
|---|---|---|---|
| 4,879,455 A | 11/1989 | Butterworth et al. | |
| 4,916,687 A | 4/1990 | Endo | |
| 5,434,395 A | 7/1995 | Storck et al. | |
| 5,579,296 A | 11/1996 | Smith et al. | |
| 5,590,197 A | 12/1996 | Chen et al. | |
| 5,677,955 A | 10/1997 | Doggett et al. | |
| 5,822,737 A | 10/1998 | Ogram | |
| 5,826,245 A | 10/1998 | Sandberg-Diment | |
| 5,844,218 A | 12/1998 | Kawan et al. | |
| 5,845,070 A | 12/1998 | Ikudome | |
| 5,883,810 A | 3/1999 | Franklin et al. | |
| 5,915,093 A | 6/1999 | Berlin et al. | |
| 5,932,870 A | 8/1999 | Berson | |
| 5,943,423 A | 8/1999 | Muftic | |
| 6,016,298 A | 1/2000 | Fischer | |
| 6,019,284 A | 2/2000 | Freeman et al. | |

(Continued)

FOREIGN PATENT DOCUMENTS

EP   0 936 583   8/1999

(Continued)

OTHER PUBLICATIONS

International Search Report of PCT/US2008/005061 dated Aug. 28, 2008.

(Continued)

*Primary Examiner*—Karl D. Frech
(74) *Attorney, Agent, or Firm*—Christie, Parker & Hale, LLP

(57) ABSTRACT

A computer readable universal authorization card system including a card having a computer readable portion for conducting communications over a global network and a magnetic stripe for interfacing with card readers is disclosed. Here, the magnetic stripe has a stripe length and a stripe width, the card has a card length and a card width, and the stripe length is shorter than the card length.

31 Claims, 9 Drawing Sheets

U.S. PATENT DOCUMENTS

| | | | |
|---|---|---|---|
| 6,038,551 | A | 3/2000 | Barlow et al. |
| 6,070,798 | A | 6/2000 | Nethery |
| 6,179,205 | B1 | 1/2001 | Sloan |
| 6,179,209 | B1 | 1/2001 | Goodwin et al. |
| 6,182,891 | B1 | 2/2001 | Furuhashi et al. |
| 6,282,656 | B1 | 8/2001 | Wang |
| 6,340,117 | B1 | 1/2002 | Eisele et al. |
| 6,400,675 | B1 | 6/2002 | Everidge et al. |
| 6,412,692 | B1 | 7/2002 | Miyagawa |
| 6,424,616 | B1 | 7/2002 | Al-Askari |
| 6,477,578 | B1 | 11/2002 | Mhoon |
| 6,484,940 | B1 | 11/2002 | Dilday et al. |
| 6,513,709 | B1 | 2/2003 | Hansen |
| 6,529,885 | B1 | 3/2003 | Johnson |
| 6,581,839 | B1 * | 6/2003 | Lasch et al. ............ 235/487 |
| 6,597,653 | B1 | 7/2003 | Burnett |
| 6,760,280 | B1 | 7/2004 | Schoppe |
| 6,970,852 | B1 | 11/2005 | Sendo et al. |
| 2002/0170958 | A1 | 11/2002 | Madani |
| 2003/0155425 | A1 | 8/2003 | Lynch |

FOREIGN PATENT DOCUMENTS

| | | |
|---|---|---|
| JP | 2002-83130 | 3/2002 |
| WO | WO 99/22340 | 5/1990 |
| WO | WO 00/68868 | 11/2000 |
| WO | WO 00/74007 A1 | 12/2000 |
| WO | WO 01/01622 A2 | 1/2001 |
| WO | WO 01/09855 A1 | 2/2001 |

OTHER PUBLICATIONS

International Preliminary Report on Patentability, dated Oct. 29, 2009, for International Application No. PCT/US2008/005061, noting U.S. Publication 2002/0170958, previously filed in an IDS dated Dec. 4, 2008, 6 pgs.

* cited by examiner

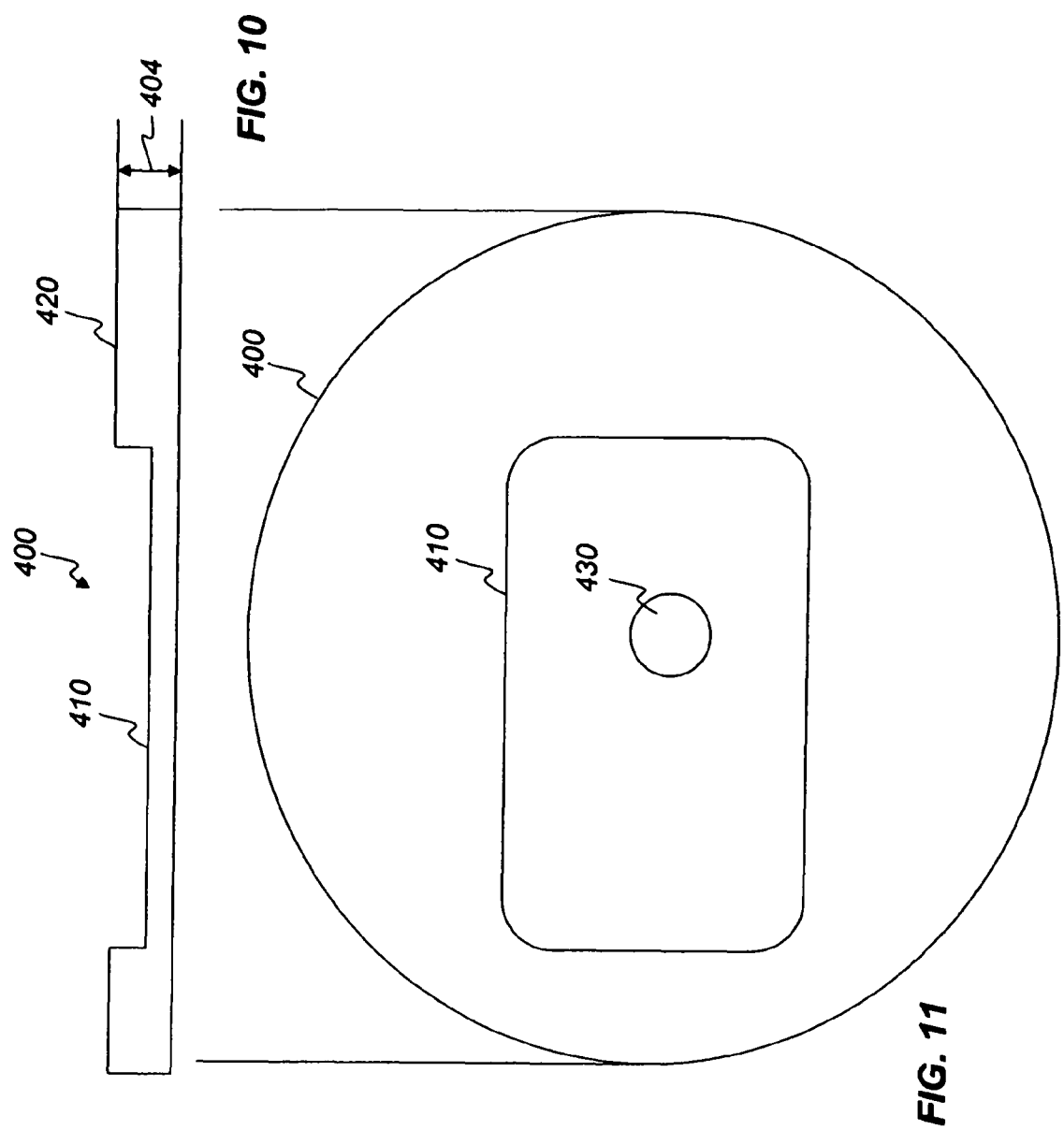

COMPUTER READABLE UNIVERSAL AUTHORIZATION CARD SYSTEM AND METHOD FOR USING SAME

CROSS-REFERENCE TO RELATED APPLICATION(s)

The present application is a continuation-in-part of U.S. patent application Ser. No. 10/145,650, filed May 15, 2002, now U.S. Pat. No. 7,299,980 entitled "COMPUTER READABLE UNIVERSAL AUTHORIZATION CARD SYSTEM AND METHOD FOR USING SAME," which claims priority to and the benefit of U.S. Provisional Patent Application No. 60/291,180, entitled "CD ROM CREDIT CARD AND METHOD FOR USING THE SAME", filed May 15, 2001. In addition, this application contains subject matter that is related to U.S. Pat. No. 6,749,114, filed May 15, 2002, entitled "UNIVERSAL AUTHORIZATION CARD SYSTEM AND METHOD FOR USING THE SAME." The entire content in each of the above-referenced applications is incorporated by reference.

BACKGROUND OF THE INVENTION

This invention relates to systems and methods for facilitating communications and or commercial transactions over a public network, such as the Internet. More particularly, this invention relates to systems and methods for conducting secure online transactions.

Due to the development of the World Wide Web ("Web"), online commerce over the Internet has experienced dramatic growth in recent years. The Internet is used to conduct a broad range of commercial and financial transactions. Parties often use the communication capabilities of the Internet to enter into contracts or conduct business electronically and use electronic fund transfers (EFTs) to satisfy the resulting financial obligations. An EFT involves the movement of finds from one bank account to another in response to electronically-communicated payment instructions.

For example, an increasing number of merchants are developing websites that consumers may access and use to purchase goods and/or services. It is now common for a consumer to browse a merchant's online catalog, select a product, place an order for the product, and pay for the product all electronically over the Internet.

Although the Internet offers a fast, reliable, and efficient way to communicate and conduct business, information transmitted over the Internet of other global networks may be vulnerable to security breaches. For example, consumers typically pay for the goods and/or services ordered over the Internet with a credit card. During the online transaction, the merchant sends an order form and asks the consumer to enter personal data such as his name, address, and telephone number, and credit card information such as an account number and expiration date. The consumer returns the completed order form containing the credit card information to the merchant over the Internet. The merchant verifies that the credit card information is valid and that the card can be charged the payment amount. The card verification is usually conducted over a proprietary card verification network, such as the Visa-Net network.

One problem with traditional online credit card transactions is the lack of signature verification. Presently, an online merchant has no way to verify that the individual providing the credit card number is authorized to use the card. The card number may be from a stolen card or merely copied from an old credit card receipt. Another problem concerns the security of the credit card data as it travels over the Internet. The credit card information can be intercepted en route, copied into a database and used to make unauthorized purchases. In an automated environment, a thief can repeatedly use the stolen credit card information to readily conduct many online transactions before the consumer ever becomes aware that the credit card data has been stolen.

SUMMARY OF THE INVENTION

The computer readable universal authorization card system and method of the present invention substantially improves on the prior art online commerce model. With the computer readable universal authorization card, data is securely transmitted over the Internet, and even if stolen, the data cannot be used by the thief to make unauthorized online transactions. In addition, the card includes a user verification feature. Further, the computer readable universal authorization card is entirely compatible with existing systems for settling accounts.

In one aspect of the present invention a computer readable universal authorization card is sized in accordance with standard size debit cards. An exemplary card includes a computer readable portion for conducting secure communications over a global network and a magnetic stripe that is compatible with conventional ATM or point of sale debit card readers. An exemplary embodiment may further include an adapter having an impression on one side for retaining the card within the adapter wherein the adapter interfaces the card with a local media reader.

An embodiment of the present invention provides a computer readable universal authorization card system. The computer readable universal authorization card system includes a card having a card length and a card width. In addition, the card includes computer readable media on a first side of the card for conducting communications over a global network and a magnetic stripe on a second side of the card for interfacing with card readers and having a stripe length and a stripe width. Here, the stripe length is shorter than the card length.

In one embodiment of the computer readable universal authorization card system, the stripe width is shorter than the card width.

In one embodiment of the computer readable universal authorization card system, one end of the magnetic stripe is at least about 10 millimeters from one end of the card and/or one side of the magnetic stripe is at least about 4 millimeters from one side of the card.

In one embodiment of the computer readable universal authorization card system, each end of the magnetic stripe is at least about 10 millimeters from each end of the card.

In one embodiment, the computer readable universal authorization card system further includes an adapter having a recess in a first portion for retaining the card within the adapter and wherein the adapter interfaces the card with a media reader.

In one embodiment of the computer readable universal authorization card system, the computer readable media includes a CD-ROM, and the adapter interfaces the card with a CD-ROM drive.

In one embodiment of the computer readable universal authorization card system, the card further includes a card aperture translated off center of the card, and the adapter includes an adapter aperture overlapping with the card aperture for interfacing the card with a media reader.

In one embodiment of the computer readable universal authorization card system, the recess is translated off center of the adapter.

In one embodiment of the computer readable universal authorization card system, total thickness of the adapter in a second non-recessed portion of the adapter ranges from about 1.3 to about 1.7 millimeters.

In one embodiment of the computer readable universal authorization card system, the computer readable media includes cardholder data.

In one embodiment of the computer readable universal authorization card system, the cardholder data is encrypted.

In one embodiment of the computer readable universal authorization card system, the cardholder data includes a cardholder account number.

In one embodiment of the computer readable universal authorization card system, the computer readable media further includes an authorization program stored in the computer readable media that enables remote access to the computer readable media.

In one embodiment, the computer readable universal authorization card system further includes cardholder data encoded in the magnetic stripe.

In one embodiment of the computer readable universal authorization card system, at least the first portion of the adapter is optically transparent.

In one embodiment of the computer readable universal authorization card system, thickness of the card is approximately equal to depth of the recess.

In one embodiment of the computer readable universal authorization card system, thickness of the card ranges from about 0.7 to about 0.95 millimeters.

In one embodiment of the computer readable universal authorization card system, thickness of the card is about 0.78 millimeters.

Another embodiment of the present invention provides a computer readable universal authorization card. The computer readable universal authorization card includes a card having a card length and a card width, computer readable media disposed on a first side of the card and for conducting communications over a global network; and a magnetic stripe on a second side of the card and for interfacing with card readers. Here, the magnetic stripe has a stripe length and a stripe width, and the stripe length is shorter than the card length.

In one embodiment of the computer readable universal authorization card, the stripe width is shorter than the card width.

In one embodiment of the computer readable universal authorization card, one end of the magnetic stripe is at least about 10 millimeters from one end of the card and/or one side of the magnetic stripe is at least about 4 millimeters from one side of the card.

In one embodiment of the computer readable universal authorization card, another end of the magnetic stripe opposite to the one end of the magnetic stripe is at least about 10 millimeters from another end of the card opposite to the one end of the card.

Another embodiment of the present invention provides a system for facilitating online transactions. The system for facilitating online transactions includes a computer readable universal authorization card having a card length and a card width. The computer universal authorization card includes computer readable media on a first side of the computer universal authorization card and a magnetic stripe on a second side of the computer universal authorization card. The magnetic stripe has a stripe length and a stripe width. The stripe length is shorter than the card length. In addition, the system for facilitating online transactions includes a cardholder computing system including a local computing device having a media reader for reading the computer readable media on the first side of the computer universal authorization card and for enabling a merchant computing device to remotely access and read data stored in the computer readable media via a global network. The merchant computing device is adapted to communicate the read data to an issuing institution computing device via another network. Here, the issuing institution computing device is adapted to read the communicated data and to query a holder of the computer readable universal authorization card for an access code assigned to the computer readable universal authorization card, and the issuing institution computing device is adapted to authorize a transaction upon verification of the access code.

In one embodiment of the system for facilitating online transactions, the issuing institution computing device is further adapted to restrict the transaction unless the access code has been verified.

In one embodiment, the system for facilitating online transactions further includes an acquiring institution computing device contemporaneously connected to the another network, and the merchant computing device is adapted to transmit the data stored in the computer readable media to the issuing institution computing device via the acquiring institution computing device.

In one embodiment of the system for facilitating online transactions, the data stored in computer readable media is encrypted, and the encrypted data is decrypted only at the issuing institution computing device.

In one embodiment of the system for facilitating online transactions, the stripe width is shorter than the card width.

In one embodiment of the system for facilitating online transactions, one end of the magnetic stripe is at least about 10 millimeters from one end of the card and/or one side of the magnetic stripe is at least about 4 millimeters from one side of the card.

BRIEF DESCRIPTION OF THE DRAWINGS

FIG. 10 is a cross-sectional view of an adapter for interfacing the computer readable universal authorization card with a standard media reader in accordance with an exemplary embodiment of the present invention; and FIG. 11 is a plan view of the adapter of FIG. 9 graphically illustrating the depression in the adapter for retaining the computer readable universal authorization card in accordance with an exemplary embodiment of the present invention.

DETAILED DESCRIPTION

Figure 1:
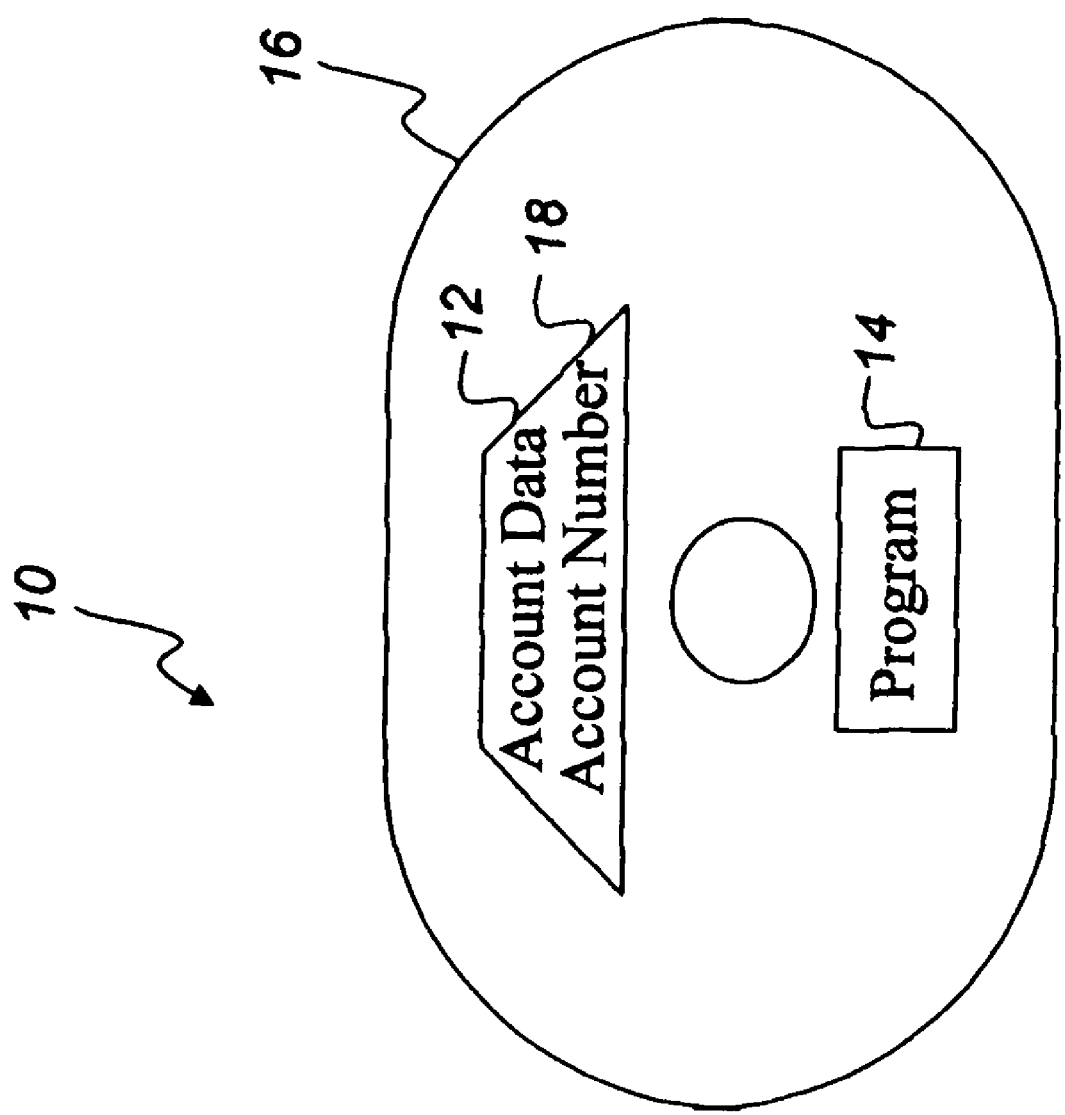
FIG. 1 is a schematic illustration of a computer readable universal authorization card in accordance with an exemplary embodiment of the present invention.

An exemplary embodiment of the present invention provides a method and apparatus for securely communicating information over a global network and for interfacing with standard debit card readers. The described exemplary embodiment provides a user verification feature such as a personal identification number which substantially duplicates the security provided by the personal verification that may accompany typical face to face transactions. Although in one embodiment the present invention will be described as a CD-ROM credit card, it is to be emphasized that the present invention may be implemented on any computer readable media such as DVD, MP3, or floppy disk, or any other computer readable media. In addition, given the rapid rate of technological development in the field of computing, it is expected that other storage media suitable for use with the credit card of the present invention will be developed. In addition, the present invention is not limited to credit cards, rather the present invention is equally applicable to stored value cards, ATM cards, gift cards, access cards, loyalty cards, etc.

An exemplary embodiment of the present invention provides a method and apparatus for securely transferring funds over an insecure global network. The described exemplary system preferably encrypts payment data such as for example credit card or debit card information prior to the communication of the payment data over the insecure network. In addition, in an exemplary embodiment the online merchant does not decrypt the payment data. Rather, the cardholder may be redirected to the web site of the financial institution that issued the card or an authorized third party and the encrypted data may then be directly communicated to the issuing financial institution. Alternatively, the merchant may simply forward the encrypted data to the issuing financial institution.

In accordance with an exemplary embodiment, the issuing institution or an authorized third party may then decrypt the payment information and authenticate the buyer using for example a personal identification number. The issuing financial institution may then verify the balance of the buyer's account and may then authorize payment and utilize conventional proprietary credit card systems to initiate a guaranteed payment to the merchant. Therefore, the described exemplary payment method integrates with current electronic payment systems and associated protocols which are entrenched in the merchant and banking communities and experience a high level of acceptance and trust. The described exemplary system therefore does not usurp current electronic payment systems, nor does it require merchants to implement different systems and protocols.

In an exemplary embodiment of the present invention the transmission of data between the parties participating in the online transaction may be made using any one of a variety of secure protocols. One of skill in the art will appreciate that there are a variety of ways to encrypt data streams ranging from those that provide highly secure packets to those that provide a basic level of encryption. Determining the best way to encrypt the streams usually involves a trade-off between level of security and computational expense. Often, the more secure the encryption, the more complex the mathematical algorithm and the more processing power (and added latency as a result) required to encrypt the packet.

For example, in an exemplary embodiment transmission of data may be made using secure socket layer (SSL) protocols and standard 128 bit encryption technology. SSL protocol is an optional layer that fits between the transmission control protocol (TCP) layer and the hypertext transfer protocol (HTTP) layer. SSL verifies the identity of the parties involved in a secure transaction and ensures that data transmission is protected from tampering or interception. As is known in the art SSL protocol supports a plurality of cryptographic algorithms. It is assumed however that 128 bit data encryption may be utilized for secure sessions. One of skill in the art will appreciate however that the present invention is not limited to a particular security protocol or encryption technique. Rather, it is expected that secure-data-transmission protocols and encryption technology will continue to improve and that future developments in these technologies will be applicable to the credit card of the present invention. In addition, higher levels of encryption may also be used to provide greater security without affecting the operation of the present invention.

FIG. 1 illustrates the described exemplary CD-ROM credit card 10. In accordance with an exemplary embodiment the CD-ROM 16 used for the CD-ROM credit card may be a conventional CD-ROM which is configured to have a length and width suitable for carrying in a purse or wallet, yet is still readable by a typical CD-ROM drive. In an exemplary embodiment the CD-ROM credit card may store encrypted consumer account information 12 which typically will include the same account information found on a conventional credit card such as, for example, the consumer's account number 18 expiration date, etc. One of skill in the art will appreciate that there are a variety of cipher or encryption algorithms that may be used to encrypt the consumer account information. For example, in an exemplary embodiment DKPUT, DES, Triple DES, DSA, RSA, etc. may be used to encrypt the card holder data.

An exemplary embodiment of the CD-ROM credit card of the present invention may also comprise an authorization computer program 14. In one embodiment the authorization computer program may be self-executing and may function to enable data stored on the CD-ROM credit card to be remotely accessed. For example, in one embodiment the authorization program may reset permission on the card holder's computing system to allow the removable media, in this instance the CD-ROM, to be accessed remotely. The authorization computer program 14 may comprise a Java application or any other suitable code.

Figure 2:
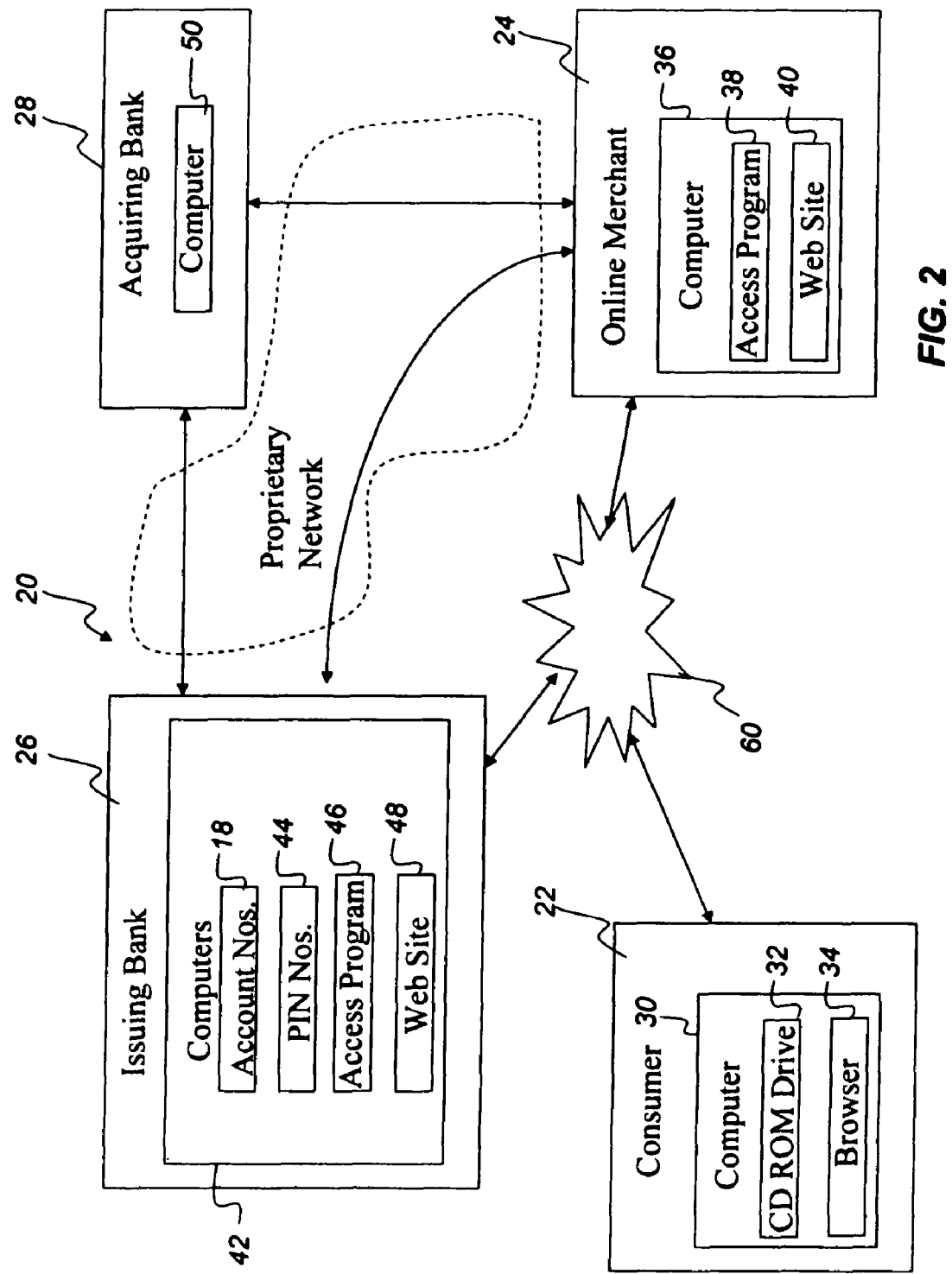
FIG. 2 is a simplified block diagram illustrating an online commerce system in accordance with an exemplary embodiment of the present invention.

Referring now to FIG. 2, a simplified block diagram of an exemplary online commerce system 20 for conducting online commerce transactions is depicted. In the described exemplary embodiment there may be at least three parties that participate in an exemplary online commerce transaction, a consumer 22, an online merchant 24, and an issuing bank 26.

One of skill in the art will appreciate that the consumer and merchant may represent individuals, entities, or businesses. In addition, although labeled as a bank, the issuing bank may represent a bank or any other type of financial institution that issues credit cards or debit cards. It should also be noted that in many online transactions there may be a fourth party, namely an acquiring bank 28 or other intermediary settlement institution involved in the transaction, to process the merchant's credit card transactions.

In an exemplary online commerce system 20 a consumer or cardholder 22, online merchant 24, issuing bank 26 and acquiring bank 28 are equipped with a computing system to facilitate online commerce transactions. In the described exemplary embodiment the consumer 22 may be equipped with a computing system 30 having a CD-ROM drive 32 and a program, such as for example, a Web browser 34 for accessing a communication network 60. The consumer's computing system may take many forms but may typically be in the form of a personal computer. However, the consumers computing system may also be a notebook computer, or any other device having the ability to read stored media, and being capable of engaging in communication over communication network 60.

In accordance with an exemplary embodiment the online merchant 24 may have a computing system 36 that may often be in the form of a computer server which may be capable of hosting a website 40. In addition, the issuing bank 26 may also have a computing system 42 that may often be in the form of a computer server which may also be capable of hosting a website 48. While only one customer 22 is shown in FIG. 2, it will be understood that the exemplary online commerce system 20 is capable of interaction with multiple customers through a suitable interface.

In the described exemplary embodiment, the acquiring bank 28, if any, may also have a computing system 50. The computers of the issuing and acquiring banks may often be in the form of a mainframe computer, but other implementations such as a micro-computer, a networked set of computers and the like, are also possible. Typically, the other participants to the online commerce transaction will also have a CD-ROM drive, though this is not required for the system and method of the present invention to operate.

The computing systems 30, 36, 42, and 50 (if present) may engage in two-way communication over a suitable communication network 60. In one embodiment, communication network 60 may comprise a global computer network such as for example the Internet. However, it will be understood by those skilled in the art that the communication network may take many different forms, such as an interactive television network, a local area network (LAN), wide area network (WAN), wired telephone network, wireless network, or any other network that supports data communication between respective entities.

In this context the computing systems may or may not be connected to the network at all times. For instance, the consumer's computing system may employ a modem to occasionally connect to the Internet, while the issuing bank's computing system may maintain a permanent connection to the Internet. The merchant's computing system 36 and the issuing bank's computing system 42 may also be coupled to a proprietary electronic funds transfer ("EFT") network, such as those operated by First Data, Vital, Star or Cirrus. Where an acquiring bank 28 is involved in the transaction, the acquiring and issuing bank's computing systems 50 and 42 respectively may also be connected by a proprietary EFT network.

The described exemplary electronic payment method may provide advantages for both consumers and merchants regarding EFT network interchange fees (fees charged by an issuing bank to an acquiring bank when both are involved in the online commerce transaction). However, one of skill in the art will appreciate that an EFT network is not required for the system and method of the present invention to operate.

Figure 3:
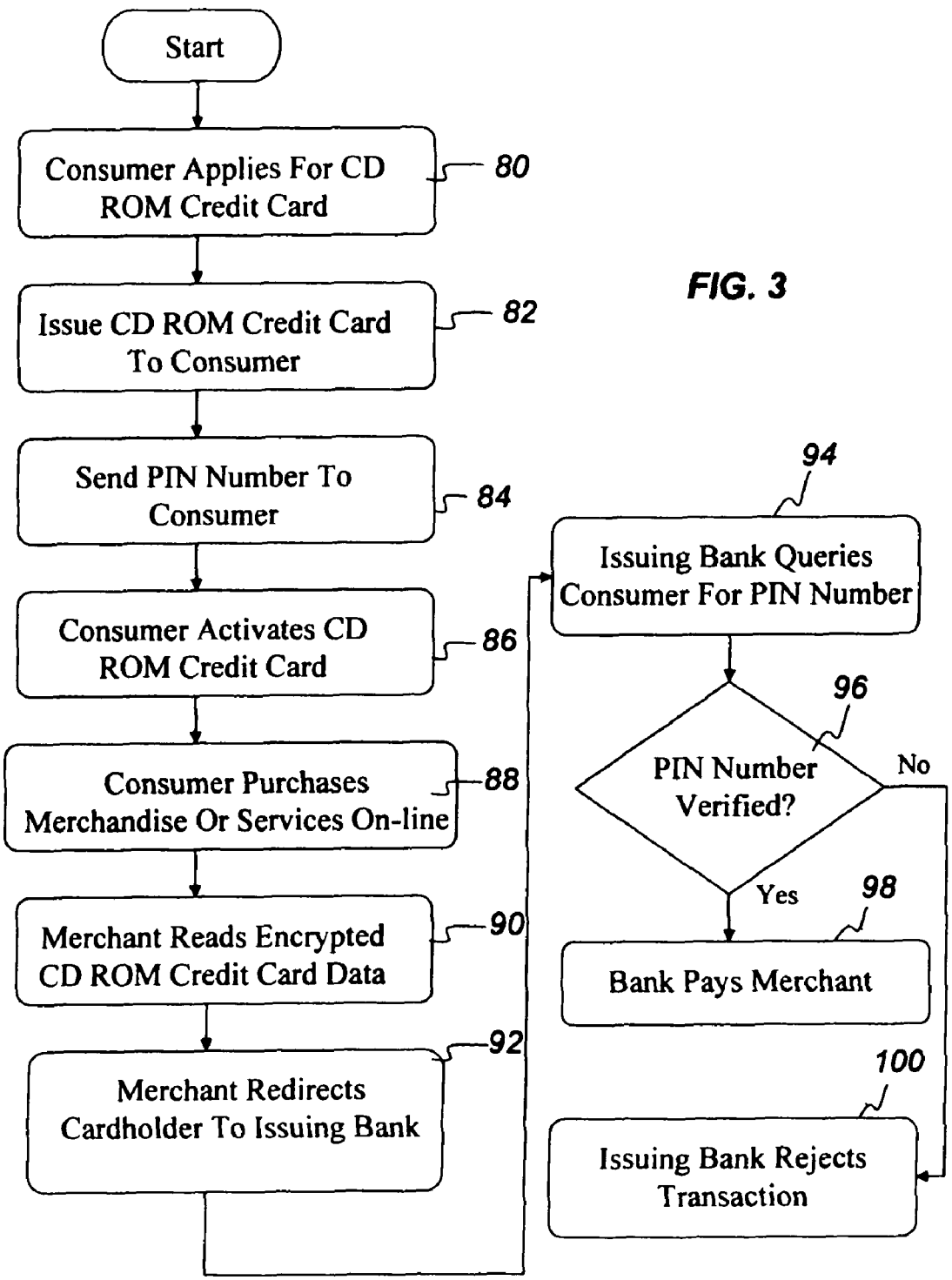
FIG. 3 is a flow chart graphically illustrating the processing of a consumer purchase in accordance with an exemplary embodiment of the present invention.

Referring to FIGS. 2 and 3, in an exemplary embodiment a consumer 22 may apply to an institution such as for example, an issuing bank 26 for the described exemplary CD-ROM credit card 80. A consumer may apply for the described exemplary CD-ROM credit card in accordance with any of a variety of known methods. For example, the consumer may apply for the CD-ROM credit card by mail, telephone, in-person, or online. In an exemplary embodiment, the consumer may access an issuing bank's website and download an application module. The application module may contain a "Help Wizard" to assist the consumer in filling out the application.

In an exemplary embodiment the application module may present web pages created with hyper text markup language ("HTML") which request certain personal and financial information, such as the consumer's name, address, telephone number, social security number, income, presently owned credit cards, bank affiliations, and the like. The consumer may complete the online CD-ROM credit card application and submit the application to the issuing bank. In the described exemplary embodiment the registration module contains all of the routing information required to direct the application over the Internet to the issuing bank.

In accordance with an exemplary embodiment the issuing bank 26 evaluates the consumer's CD-ROM credit card application and informs the consumer as to whether the card will be granted or denied 82. In one embodiment this information may be conveyed to the consumer 22 in the same manner the credit application was received by the issuing bank. In the described exemplary embodiment, this message is transmitted by email. When the issuing bank grants a CD-ROM credit card, the card may be assigned an account number, expiration date and an associated personal identification number (PIN). In an exemplary embodiment the issuing bank may send the CD-ROM credit card to the consumer by parcel post or any known parcel delivery service. In addition, the issuing bank may send the PIN number assigned to the account to the consumer, typically in a separate mailing (or by email) for security reasons 84.

In the described exemplary embodiment the consumer may load the CD-ROM credit card into a CD-ROM drive to activate the CD-ROM credit card 86. In one embodiment the self-executing authorization program may automatically install itself on the consumer's computing system and enable the CD-ROM drive to be read remotely, for example, from a remote website via a global computer network. Alternatively, the authorization program may activate an installation wizard or the web browser on the consumer's computing system and ask the consumer whether he wants to have the authorization program installed.

Upon successful installation of the authorization program, the consumer may access the issuing bank's website 48 which may then read the encrypted information on the consumer's CD-ROM credit card by means of an access program 46. In an exemplary embodiment the access program 46 may be in the form of a Java application or any other suitable code. Upon receiving and decrypting the encrypted card holder data, which maps to an account number 18, the issuing bank's website requests that the consumer transmit his PIN number 44 to the issuing bank. One of skill in the art will appreciate that the issuing bank may establish a secure session between itself and the consumer, and the consumer's PIN number 44 may be encrypted prior to communication to the issuing bank via the secure session. In accordance with an exemplary embodiment the issuing bank may validate the consumer's PIN number 44 and activate the consumer's CD-ROM credit card.

In the described exemplary embodiment the consumer may initiate an online commercial transaction by invoking his web browser and navigating to an online merchant's web site to purchase a particular product or service 88. In operation many online merchant web sites include shopping carts and associated order forms displayed in the form of Web pages that a consumer may complete to purchase selected items. Often the online order form may include a payment section where the consumer may indicate a desire to pay for the purchase with the described exemplary CD-ROM credit card.

In accordance with an exemplary embodiment the merchant's website 40 may prompt the consumer to load the described exemplary CD-ROM credit card into his CD-ROM drive. The consumer may then indicate that the CD-ROM credit card is loaded into the drive at which point the access program 38 on the merchant's website may read the encrypted CD ROM credit card data 90. In the described exemplary embodiment the online merchant does not have the key to decipher the encrypted payment data. Rather, the merchant may redirect the card holder to the issuing institution identified on the CD-ROM credit card 92. The described exemplary payment system may therefore reduce merchant credit card fraud by denying the merchant access to the consumer's payment information.

One of skill in the art will appreciate that in operation a merchant may simply redirect the consumer to the issuing bank's web site and the issuing bank may establish a secure session with the consumer and read the encrypted credit card data directly from the cardholder's CD-ROM credit card using the access program 46 on the issuing bank's computing system 42. In this embodiment, the merchant may never have access to the CD-ROM data so that the data need not be encrypted if communicated via a secure session as previously described.

In accordance with an exemplary embodiment the issuing bank may decipher the consumer's encrypted payment data and if necessary establish a secure connection with the consumer's computing system. In one embodiment the issuing bank may prompt the consumer to enter his PIN number 94 to validate the identity of the consumer. In the described exemplary embodiment the issuing bank may then verify the PIN number 96 and reject the transaction if the PIN number is not verified 100. In an exemplary embodiment the issuing bank may give the consumer a predetermined number of attempts to transmit the correct PIN number before rejecting the transaction. If the PIN number is validated, the issuing bank may verify that the consumer's account is in good standing with sufficient available credit to pay for the purchase. The issuing bank may authorize the transaction, reduce the consumer's available credit by the purchase amount and subsequently make payment to the merchant 98.

The described exemplary CD-ROM credit card may also be utilized in online transactions involving an acquiring bank that processes the merchant's credit card transactions. In these instances the issuing bank may charge the acquiring bank a fee, known as an "interchange fee," for processing the transaction. Such transactions may often take place over proprietary EFT networks. In practice the amount of the interchange fee often varies in accordance with the type of credit card transaction and may be separately established by each particular credit card association, such as, for example, Visa, Mastercard, or Discover. Within each particular association, the interchange fees may often be set at the same rate for all issuing banks. In general, there are two types of credit card transactions, card-swipe transactions and card-not-present transactions.

A card-swipe transaction is a conventional in-store, retail transaction where a consumer purchases a product in the merchant's store and the consumer's credit card is physically swiped through a card reader. Typically, the merchant will attempt to verify that the consumer is the valid card holder by matching the consumer's signature with the signature on the credit card, or by asking for a valid identification, etc. Card-swipe transactions may therefore have a greater degree of security than card-not-present transactions where a consumer may make a purchase over the phone, or online, by giving the merchant a credit card number only. Therefore, the identity of the card holder may not be verified in card-not-present transactions using conventional means such as for example signature verification, etc.

As such, the risk of fraudulent purchases may be greater in card-not-present transactions than in card-swipe transactions. Therefore, issuing banks may charge acquiring banks a higher interchange fee for card-not-present transactions than for card-swipe transactions. Presently, the interchange fee for card-swipe transactions is on the order of about 1.38% of the transaction value, while the interchange fee for card-not-present transactions is on the order of about 1.82% of the transaction value. The above stated fees are exemplary only. Each credit card association imposes its own interchange fee structure.

The security provided by the described exemplary CD-ROM credit card may encourage issuing banks to reduce or eliminate the disparity in interchange fees between card-swipe transactions and card-not-present transactions. In practice the use of a secure PIN number in online credit card transactions provides a similar degree of security as the in person signature verification of card-swipe transactions. Therefore issuing banks may process CD-ROM credit card transactions at the same rate card-swipe transactions are processed.

Figure 4:
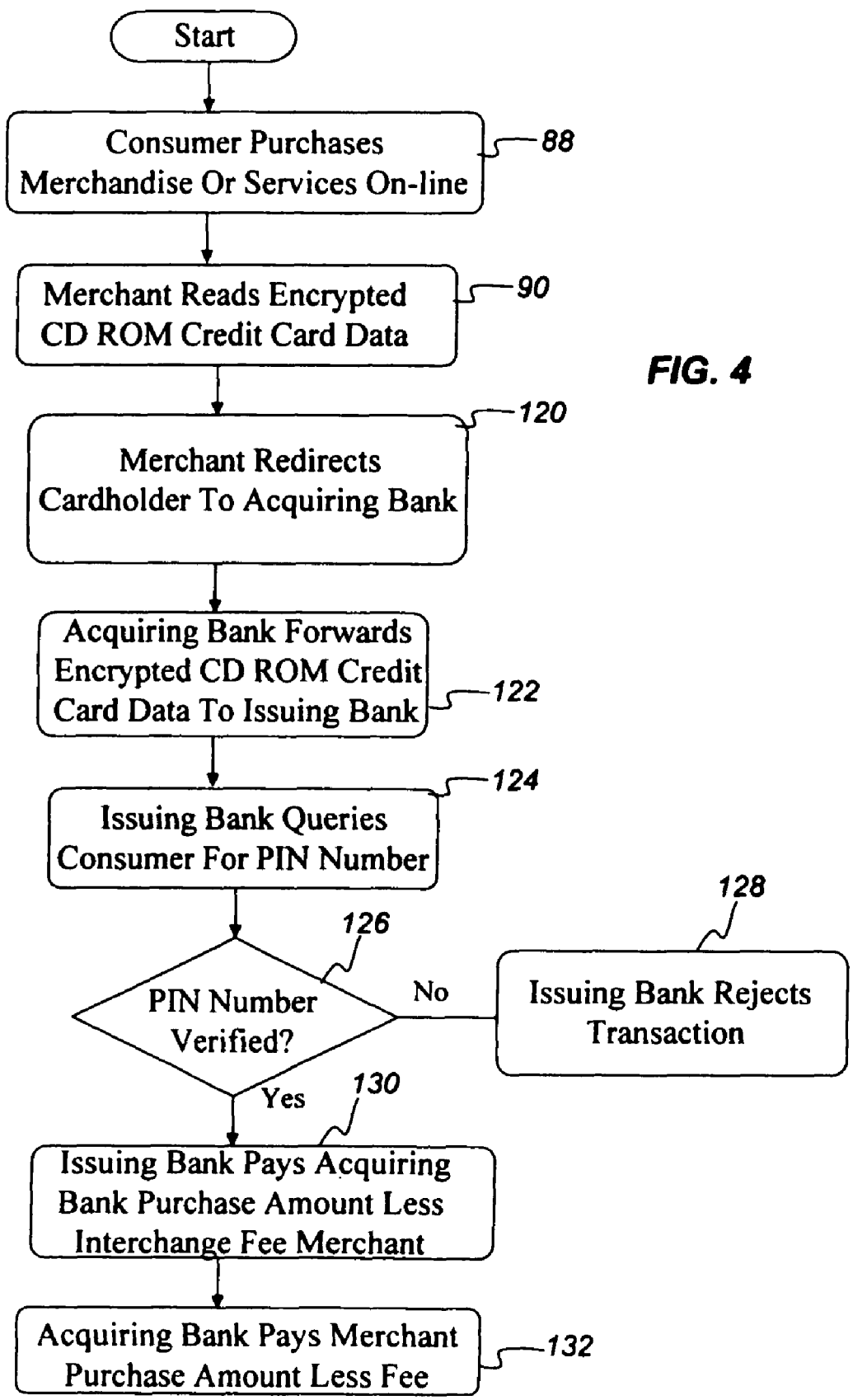
FIG. 4 is a flow chart graphically illustrating the processing of a consumer purchase while utilizing an acquiring bank in accordance with an exemplary embodiment of the present invention.

FIG. 4 graphically illustrates an exemplary online commerce transaction involving an acquiring bank. The process is similar to the transaction described in FIG. 3. For example, a consumer may again initiate an online commercial transaction by invoking his web browser and navigating to an online merchant's web site to purchase a particular product or service. The merchant's website may again prompt the consumer to load the described exemplary CD-ROM credit card into his CD-ROM drive 88. The consumer may then indicate that the CD-ROM credit card is loaded into the drive at which point the access program on the merchant's website may read the encrypted CD ROM credit card data 90. In the described exemplary embodiment the online merchant does not have the key to decipher the encrypted payment data. Rather, the merchant redirects the card holder or consumer to the acquiring bank 120 which then forwards the encrypted credit card data to the issuing bank 122.

One of skill in the art will again appreciate that in operation a merchant may simply redirect the consumer directly to the issuing bank's web site or to the acquiring bank that may then redirect the consumer to the issuing bank. The issuing bank may establish a secure session with the consumer and read the encrypted credit card data directly from the cardholder's CD-ROM credit card using the access program 46 on the issuing banks computing system 42.

In accordance with an exemplary embodiment the issuing bank may decipher the consumer's encrypted credit card data and if necessary establish a secure connection with the consumer's computing system. In one embodiment the issuing bank may prompt the consumer to enter his PIN number 124. The issuing bank may decrypt the consumer's PIN number and compare it to the PIN number of record for the received credit card account number to validate the identity of the consumer 126. In the described exemplary embodiment the issuing bank may reject the transaction if the PIN number is not verified 128.

In an exemplary embodiment the issuing bank may give the consumer a predetermined number of attempts to transmit the correct PIN number before rejecting the transaction. If the PIN number is validated, the issuing bank may verify that the consumer's account is in good standing with sufficient available credit to pay for the purchase. The issuing bank may authorize the transaction, reduce the consumer's available credit by the purchase amount and credit the acquiring bank the dollar value of the transaction less the interchange fee 130. The acquiring bank then pays the purchase amount to the merchant, less the interchange fee and any markup assessed to the merchant 132.

Advantageously, in the described exemplary electronic payment system the encrypted CD ROM credit card data is only decoded by the issuing bank. Neither the merchant, nor the acquiring bank, if any, decode the data during transaction processing. The restricted access to the CD ROM credit card data reduces the likelihood that any of the parties to the transaction will misuse the credit card data. In addition, the communication and verification of the card holders PIN number during a separate transmission from the credit card data reduces the likelihood of third party credit card fraud. In practice the prospect of an outside party successfully intercepting and decoding both the credit card data and the PIN number are remote.

Although an exemplary embodiment of the present invention has been described, it should not be construed to limit the scope of the appended claims. Those skilled in the art will understand that various modifications and improvements may be made to the system and method disclosed herein without departing from the scope of the invention. For example, the functions of the issuing and acquiring banks may be performed by third parties such as First Data Corporation and Vital, Incorporated. Third party processors often work with acquiring banks to process credit card transactions via the card associations or card issuers.

For example, in one embodiment a third-party processor communicates to the card associations or card issuers to obtain authorizations and execute funds transfers. When purchasing a product online, the CD ROM credit card holder may again use a web browser to exchange purchase information with the merchant. In this embodiment the merchant captures and communicates the purchase information and the encrypted credit card data to a third-party processor. The third-party processor then works with the appropriate card association or card issuer to execute the transaction.

It should be also be noted that the system and method of the present invention may also be applied to debit card transactions. A debit card allows the bearer to utilize the same purchasing process as with a credit or charge card, with the exception that the holder of a debit card normally may need to maintain a nonzero balance in an associated account. In practice, the use of a debit card does not involve the extension of credit to the bearer, thus the name debit or payment card.

Debit cards or payment cards are often used by customers to make purchases on-line, to withdraw funds from automated teller machines (ATMs) and more recently at point of sale (POS) terminals to gain access to their accounts for the withdrawal of funds in the form of cash or to purchase goods or services. However, debit card fraud has significantly increased as the volume of dollars moved by these services over the Internet has grown. An exemplary embodiment of the present invention provides a method and apparatus for conducting secure debit card transactions over an insecure communication network such as, for example, the Internet.

Figure 5:
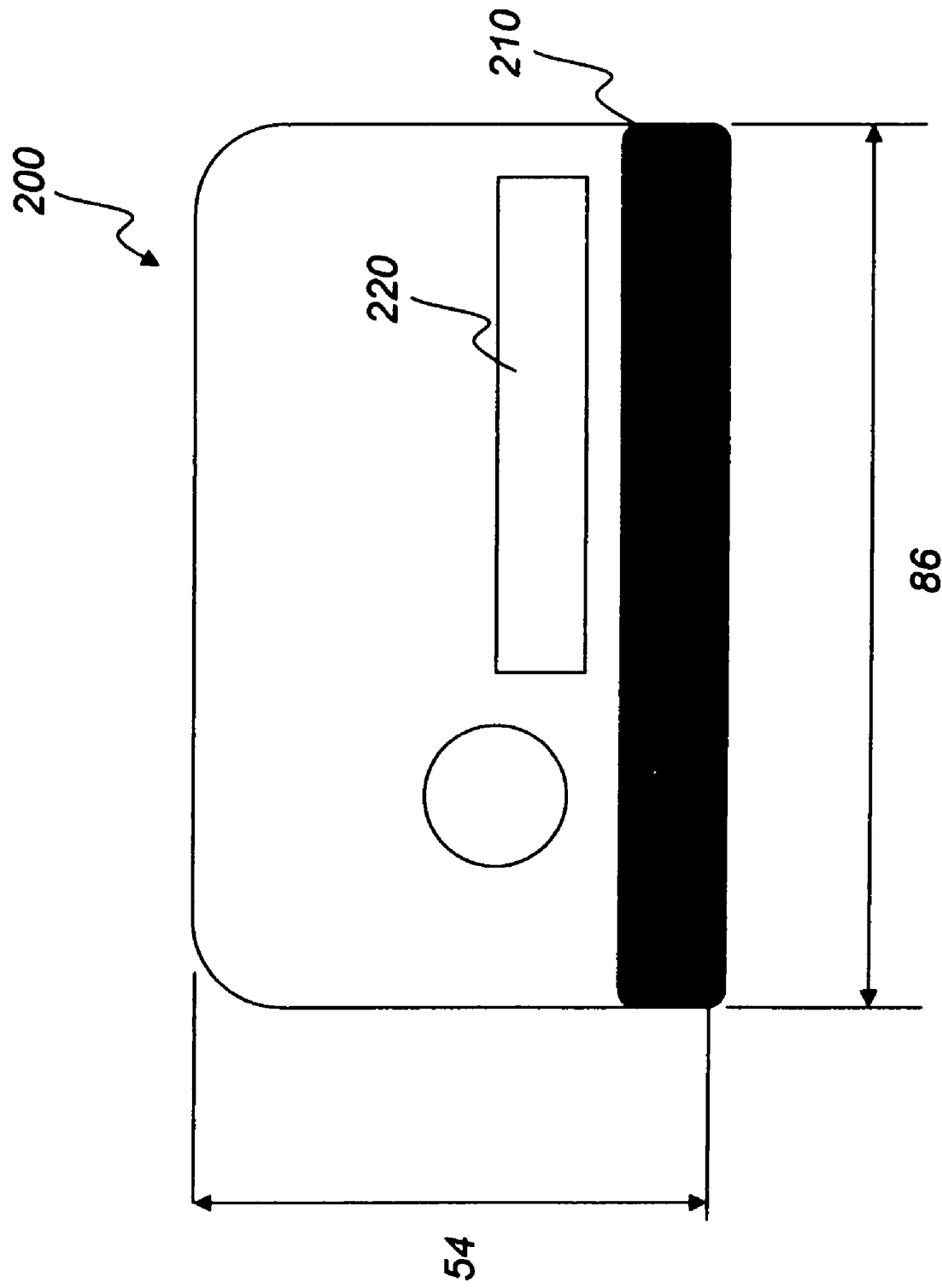
FIG. 5 is a top view of a computer readable universal authorization card illustrating an integration of a magnetic stripe, a signature line and an aperture for interfacing with a media reader in accordance with an exemplary embodiment of the present invention.

For example, referring to the top view of FIG. 5, an exemplary debit card may be sized in accordance with the requirements for conventional debit/ATM card readers. The described exemplary debit card 200 may comprise a magnetic stripe 210 on a first side of the debit card that stores magnetic information concerning the debit card account, such as, for example, the issuing institution, the owner's account number, etc. as required for operation in a conventional ATM or POS terminal. The described exemplary debit card may further comprise a signature line 220 that may be used to verify the cardholder's signature in card-swipe transactions.

Figure 6:
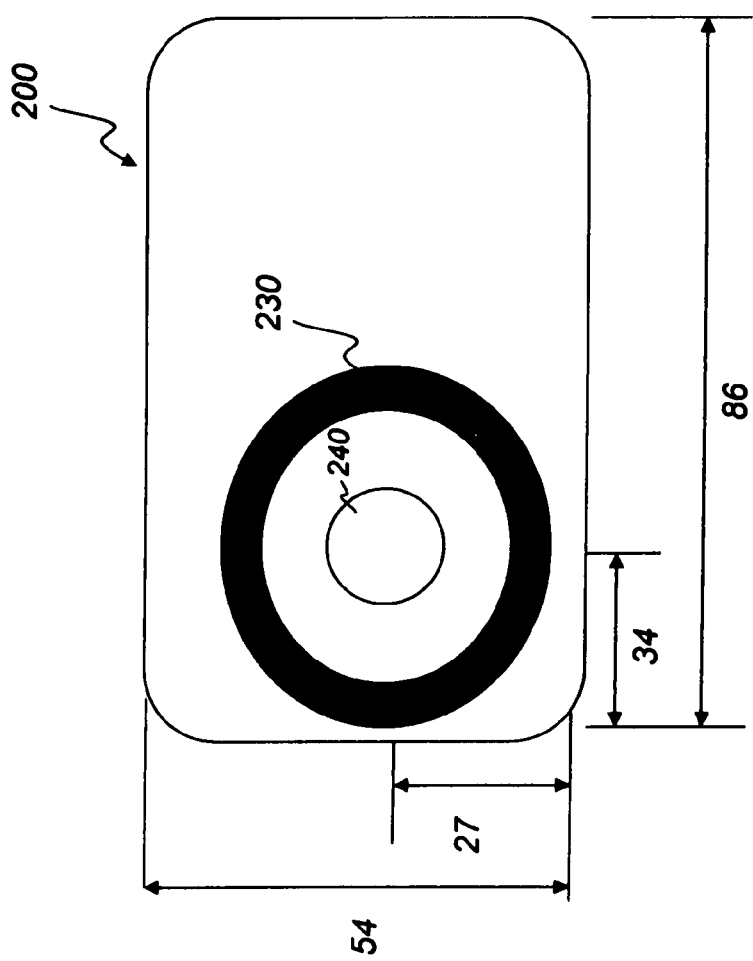
FIG. 6 is a bottom view of the computer readable universal authorization card illustrating the integration of computer readable media on a second side of the computer readable universal authorization card of FIG. 5 wherein the aperture for interfacing with a media reader is laterally translated off the center of the card in accordance with an exemplary embodiment of the present invention.
Figure 7:
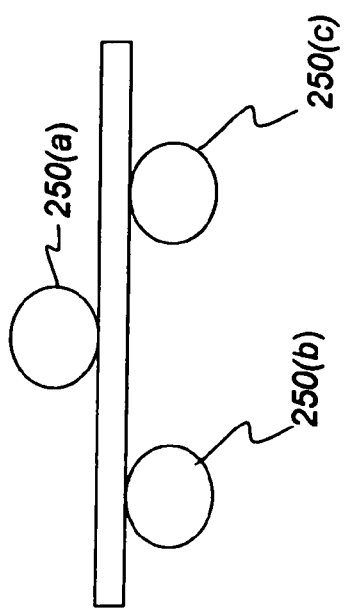
FIG. 7 is a cross-section view of a roller system used for inserting and ejecting cards into standard debit or ATM card readers.

In addition, referring to the bottom view illustrated in FIG. 6, the described exemplary debit card may further include computer readable media such as for example CD ROM compatible information 230 deposited on a second side of the described exemplary debit card. The CD ROM may again contain encrypted payment information issued by an issuing financial institution as described with respect to the CD ROM credit card illustrated in FIGS. 1-4. The described exemplary debit card may further comprise an aperture 240 for mounting in conventional CD ROM drives. However, many card readers utilize a multiple roller system 250(*a*)-250(*c*) as illustrated in FIG. 7 to insert and eject a debit card into and out of the reader. In practice, cards having an aperture located at the center of the debit card may get stuck in conventional multi-roller card reader systems.

Therefore, in an exemplary embodiment the aperture may be translated laterally away from the center of the debit card. For example, in one embodiment an exemplary debit card may be eighty-six millimeters long and fifty-four millimeters wide. The center of the aperture may be located thirty-four millimeters from one end of the card and approximately twenty-seven millimeters from one side of the card. The encoded information 230 may then be centered about the aperture for use in a CD ROM drive. One of skill in the art will appreciate that the location of the aperture may vary from application to application so that the disclosed location is by way of example only and not by way of limitation.

In addition, a card (e.g., the card 10 or 200) according to an embodiment of the present invention is fabricated by a mold-based replication system using injection molding techniques that is similar to techniques for fabricating rigid plastic CD ROM discs. The card manufacturing techniques may essentially produce a card having an all-plastic composition. The computer readable media such as for example CD ROM compatible information 230 deposited on the card may include a series of circular and/or spiral data tracks that are illuminated and read by a source of coherent light such as a laser. A layer of rigid plastic of the card positioned between each data track and the source of coherent light provides structural rigidity, protects the data tracks, and/or also functions as a lens element to refract and/or focus the cohering light beam onto a selected data track.

Also, referring back to FIG. 5, the magnetic stripe 210 on the card 200 is similar to a piece of cassette tape fastened to the back of a card. However, in one embodiment, instead of motors moving the tape so it can be read, a user can provide the motion as the user swipes the card 200 through a swipe drive reader.

Alternatively, in another embodiment, the user can insert the card 200 in a motor drive reader having a motor for providing the motion. Here, the motor drive reader typically includes a sensor adapted to detect a magnetic stripe in order to activate its motor for providing the motion. However, a typical motor drive type reader may not be compatible with a card having a computer readable media (e.g., the computer readable media 230) and/or may still be stuck in conventional multi-roller card reader systems described above.

Figure 8:
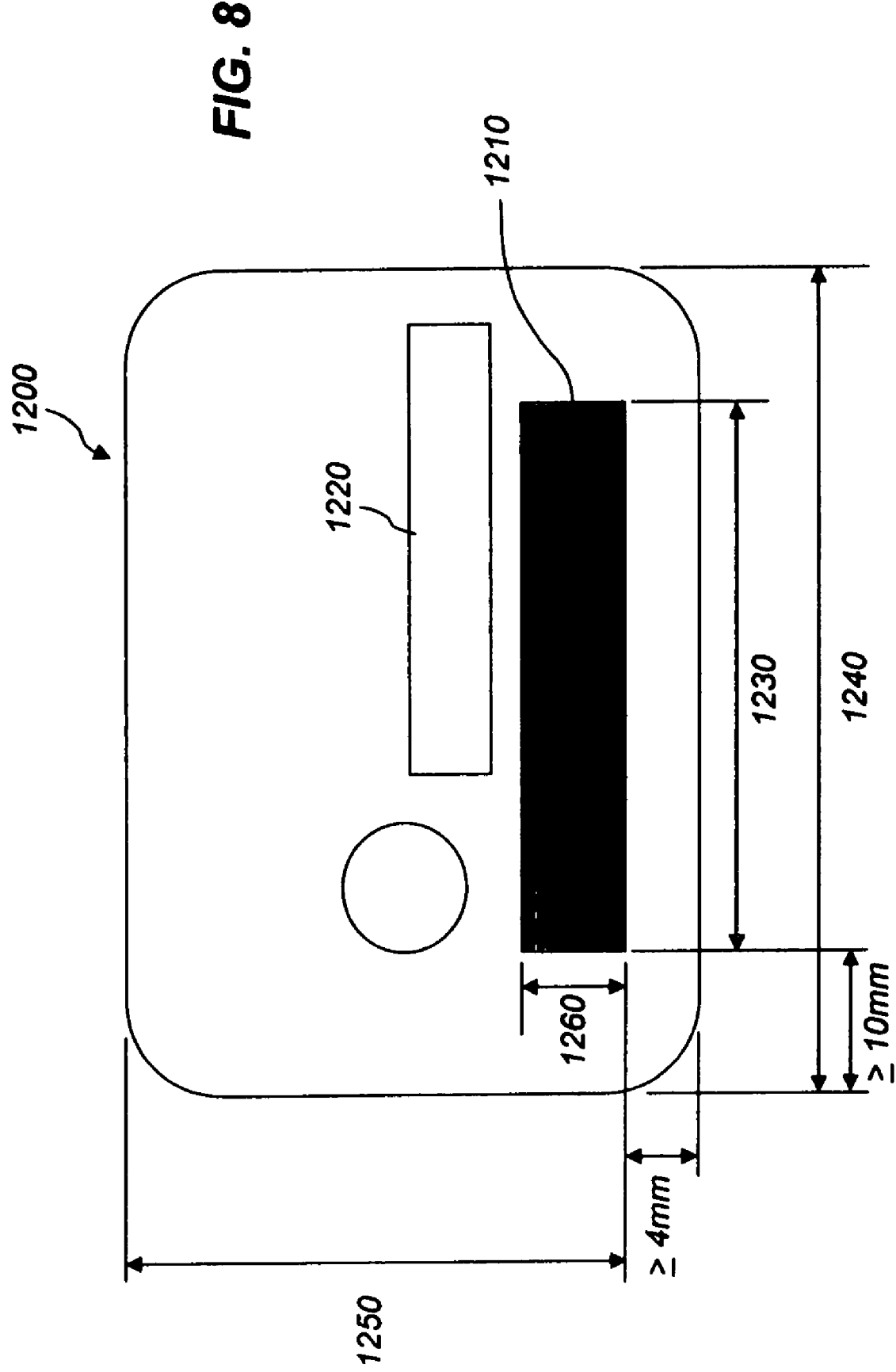
FIG. 8 is a top view of a computer readable universal authorization card illustrating an integration of a magnetic stripe, a signature line and a aperture for interfacing with a media reader in accordance with another exemplary embodiment of the present invention, wherein a stripe length of the magnetic stripe is shorter than a card length of the card.

As such, in another embodiment of the present invention and referring to FIG. 8, a card 1200 includes a magnetic stripe 1210 that has a stripe length 1230 that is shorter than a card length 1240 of the card 1200. In more detail, the card 1200 has the card length 1240 and a card width 1250 and includes the magnetic stripe 1210 on the card 1200 for interfacing with debit card readers. The stripe 1210 has the stripe length 1230 and a stripe width 1260. As shown in FIG. 8, the strip length 1230 in this embodiment is shorter than the card length 1240 so that a sensor on a motor drive reader will not detect the magnetic stripe 1210 accept the card. In addition, the stripe width 1260 may be shorter than the card width 1250.

In one embodiment, one end of the magnetic stripe 1210 is at least about 10 millimeters from one end of the card 1200 and/or one side of the magnetic stripe 1210 is at least about 4 millimeters from one side of the card 1200. In one embodiment, each end of the magnetic stripe 1210 is at least about 10 millimeters from each end of the card 1200.

The magnetic stripe 1210 may be used to store magnetic information concerning the debit card account, such as, for example, the issuing institution, the owner's account number, etc. as required for operation in a conventional ATM or POS terminal. The described exemplary debit card may further include a signature line 1220 that may be used to verify the cardholder's signature in card-swipe transactions. In one embodiment, the magnetic stripe 1210 on the card 1200 can be read when a user swipes the card 1200 through a swipe drive reader.

Figure 9:
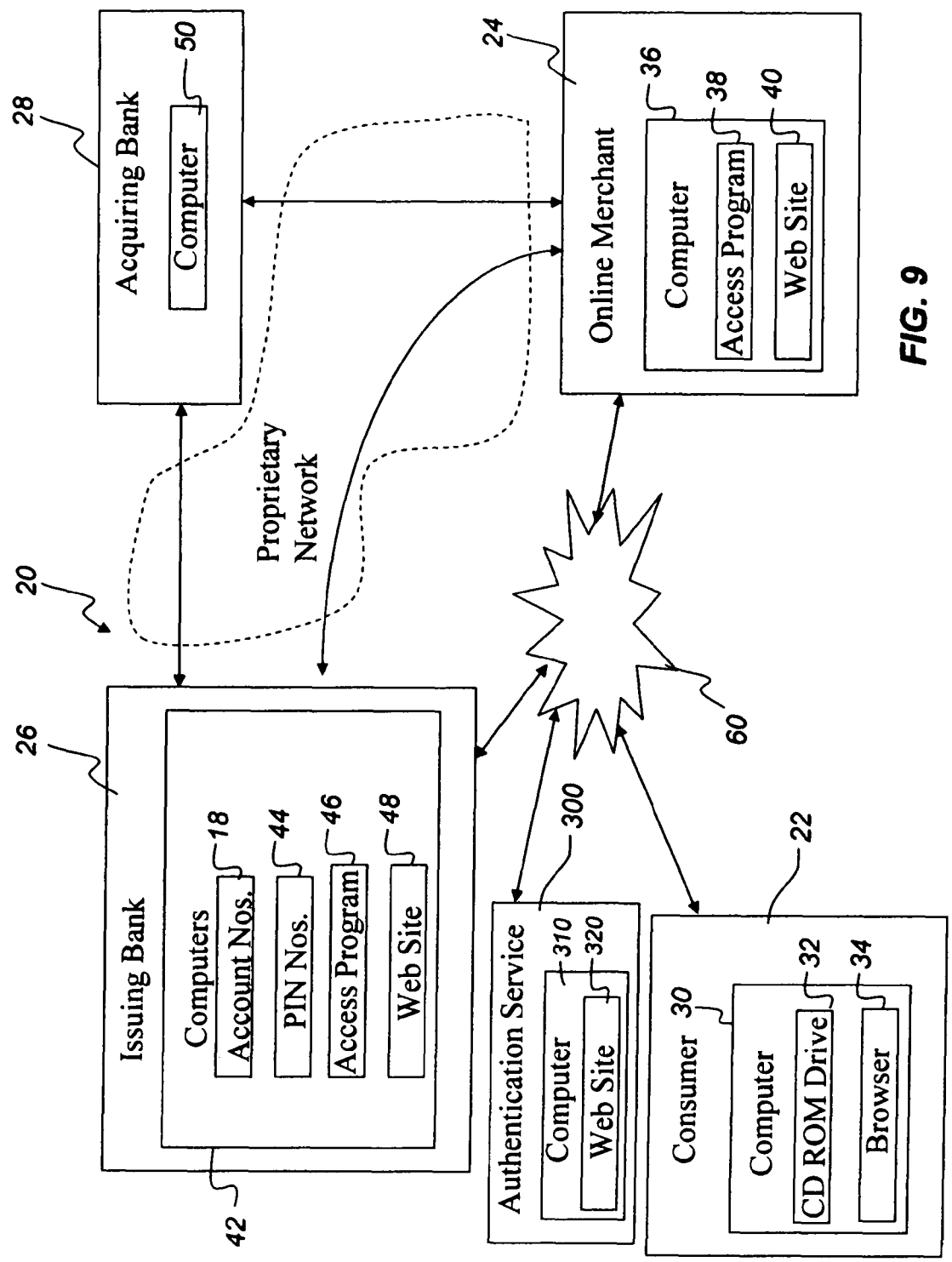
FIG. 9 is a simplified block diagram illustrating an online commerce system utilizing an authentication service for verifying identity of an application in accordance with an exemplary embodiment of the present invention.

Referring to FIG. 9, in an exemplary embodiment the consumer 22 may apply to an institution, such as, for example, an issuing bank or other financial institution or a third party service provider for the described exemplary debit card. The consumer may apply for the described exemplary CD-ROM credit card in accordance with any of a variety of known methods. For example, the consumer may apply for the debit card by mail, telephone, in-person, or online. In an exemplary embodiment, the consumer may access a financial institution's website 48 via the communication 60 and download an application module. In the described exemplary embodiment the consumer may directly access the financial institution's website or be redirected there by a merchant's website. In an exemplary embodiment of the present invention the transmission of data between the parties to the online transaction over the communication network 60 may be made using any one of a variety of secure protocols.

In an exemplary embodiment the application module may present web pages created with hyper text markup language ("HTML") which request certain personal and financial information, such as the consumer's name, address, telephone number, social security number, income, presently owned credit cards, bank affiliations, and the like. The consumer may complete the online debit card application and submit the application to the issuing financial institution. In the described exemplary embodiment the issuing institution may forward the online debit card application to one of a variety of real time authentication services 300 that may be used to authenticate the identity of the applicant. In the described exemplary embodiment the issuing financial institution may forward the debit card application to the authentication service via the global communications network 60. However, one of skill in the art will appreciate that a direct circuit switched, wireless or other link may be established between the issuing financial institution and the authentication service for communicating the debit card application.

In an exemplary embodiment, the authentication service may compare applicant's data with multiple consumer databases to verify the consistency of the information supplied on the application. In addition, in the described exemplary embodiment the issuing financial institution may redirect the applicant to a website 320 on computer 310 of the authentication service. The authentication service may then ask the applicant one or more multiple choice questions based upon shared, relatively secret information known by the consumer and stored in the databases of a limited number of credit reporting agencies that are available to the authentication service. The authentication service may then compare the answers supplied by the applicant to the stored information to further verify that the person entering the information is the actual applicant whose identity has been submitted on the application.

Once the applicant's identity has been authenticated the issuing institution may further evaluate the applicant's debit card application and may inform the applicant whether the card will be granted or denied. When the issuing institution grants a debit card, the card is assigned an account number, expiration date and an associated personal identification number (PIN). In an exemplary embodiment the issuing institution may send the debit card to the consumer by parcel post or any known parcel delivery service. In addition, the issuing institution may send the PIN number assigned to the account to the consumer, typically in a separate mailing (or by email) for security reasons.

In the described exemplary embodiment the initial debit card funding may be instantaneous, yet limited using a credit card. However, one of skill in the art will appreciate that the debit card may be funded using cash, check, wire transfers, ACH etc. In addition, in an exemplary embodiment, a buyer may further fund an exemplary debit card account by visiting the website of the issuing institution and accessing their account via a secure link to transfer funds from a credit card to the debit card account.

In an exemplary embodiment of the present invention, the magnetic stripe and the CD compatible portion (hereinafter referred to as the CD card) of the described exemplary debit card may include the information typically found on an ordinary debit card such as the identity of the card holder, the account number, etc. However, the data stored on the CD card may be encrypted as previously described with respect to the CD ROM credit card. Alternatively, the CD card may include an encryption program that may encrypt stored payment data prior to communicating that data to a remote website.

In addition, as previously described with respect to the CD-ROM credit card, the CD card may further include an executable program, such as a Java application, which may be loaded onto the consumer's computer to allow for remote access to the data stored on the CD card by a corresponding program on a remote computing system. In one embodiment the executable program may be self-installing. Alternatively, the CD card may include an application that when prompted may simply upload information stored on the CD card to a remote website.

Prior to first use, the consumer may access a website owned or controlled by the issuing financial institution to activate the account as previously described with respect to the CD ROM credit card. In an exemplary embodiment, the consumer may now go shopping online or at any of a variety of POS locations worldwide. For example, in an exemplary embodiment the consumer may proceed to an online merchant's website and select several items to purchase using the described exemplary debit card as previously illustrated with respect to the CD ROM credit card in FIGS. 3 and 4.

The described exemplary debit card therefore provides convenience of use in conventional ATM or POS card readers located around the world as well as the ability to conduct secure commercial transaction over an insecure global network. The restricted access to the debit card data again reduces the likelihood that any of the parties to the transaction will misuse the credit card data. In addition, the communication and verification of the card holder's PIN number during a separate transmission from the debit card data again reduces the likelihood of third party fraud.

The described exemplary debit card payment system may further comprise an adapter to provide increased compatibility with existing CD-ROM drives. For example, the described exemplary debit card may be in the range of about 0.7-0.95 millimeters thick and in an exemplary embodiment may be on the order of about 0.78 millimeters thick to ensure compatibility with typical ATM/POS debit card readers. One of skill in the art will appreciate, that the disclosed card thickness may vary in accordance with the thickness requirements of a given device reader so that the disclosed thickness ranges are by way of example only and not by way of limitation.

However, CD-ROM drives typically employ semiconductor lasers that transmit a Gaussian optical beam whose beamwidth varies with distance from the transmitter. Therefore, many conventional CD-ROM drives require that the CD-ROM be located within a given range of distances from the transmitter to ensure that an optical beam with a given range of beamwidths is incident upon the CD-ROM for adequate optical character recognition.

However, a debit card having a thickness that is compatible with typical ATM/debit card readers may not provide a sufficient offset from the optical transmitter in many conventional CD-ROM drives. Therefore, an adapter may be required to increase the spacing between the computer readable media on the described exemplary debit card from the optical reader in many CD-ROM drives. Further, in the exemplary embodiment, the adapter is shaped to be compatible with and securely fit within a conventional CD-ROM drive.

Therefore, referring to the cross section of FIG. 10, an exemplary debit card payment system may include an adapter 400 having an depression 410 in a first surface 420 designed to receive the described exemplary debit card. In one embodiment the thickness 404 of the adapter 400 may be in a range of about 1.3-1.7 millimeters and in an exemplary embodiment may be on the order of about 1.5 mm as may be preferred by many conventional CD-ROM drives. In addition, the thickness 404 of the depression or recession 410 is approximately equal to the thickness of the debit card, so that when installed the top surface of card is approximately flush with the top surface of the adapter.

In one embodiment the described exemplary debit card may be coupled into the adapter with the computer readable media 230 (see FIG. 7) down. Therefore, in one embodiment, the optical reader in the CD-ROM drive reads the computer readable media through the adapter. Therefore, the adapter 400 may comprise optical grade glass or plastic that is substantially transparent to the operational wavelength of the optical reader. The described exemplary adapter may be manufactured in accordance with any one of a number of known techniques such as for example, injection molding, stamping, etc. The adapter may be made in different shapes and sizes for compatibility with DVD drives or other devices for facilitating computer readability.

A top view of the described exemplary adapter is illustrated in FIG. 11. In the described exemplary embodiment the size of the depression 410 approximately mirrors the size of the debit card. Therefore, in this embodiment the debit card may be press-fit into the impression and retained therein. For example, in one embodiment, the depression 410 may have a height on the order of about 54 mm and width on the order of about 86 mm in accordance with the size of a standardized debit card (see FIG. 6). One of skill in the art will appreciate however that clips, springs or other retention mechanisms may be used to retain the card as well.

The adapter may further comprise an aperture 430 located so as to overlap with aperture 240 in the debit card (see FIG. 6) for coupling with the spindle in a CD-ROM drive. In the described exemplary embodiment the impression may be laterally offset from the center of the adapter so that the center of the aperture is located at the center of the adapter 400. In operation, a cardholder may then insert the described exemplary debit card into the adapter and insert the adapter into the CD-ROM drive of a computing system to perform a secure online transaction. Alternatively, the cardholder may simply remove the card from the adapter and utilize the described exemplary debit card like a conventional debit card at any of a number of ATM or POS locations around the world.

To those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention.

What is claimed is:

1. A computer readable universal authorization card system comprising:
    a card having a card length and a card width and comprising:
        computer readable media on a first side of the card for conducting communications over a global network, and
        a magnetic stripe on a second side of the card for interfacing with card readers and having a stripe length and a stripe width,
    wherein the stripe length is shorter than the card length.

2. The computer readable universal authorization card system of claim 1, wherein the stripe width is shorter than the card width.

3. The computer readable universal authorization card system of claim 2, wherein one end of the magnetic stripe is at least about 10 millimeters from one end of the card and one side of the magnetic stripe is at least about 4 millimeters from one side of the card.

4. The computer readable universal authorization card system of claim 1, wherein one end of the magnetic stripe is at least about 10 millimeters from one end of the card.

5. The computer readable universal authorization card system of claim 4, wherein another end of the magnetic stripe opposite to the one end of the magnetic stripe is at least about 10 millimeters from another end of the card opposite to the one end of the card.

6. The computer readable universal authorization card system of claim 1, further comprising:
an adapter having a recess in a first portion for retaining the card within the adapter and wherein the adapter interfaces the card with a media reader.

7. The computer readable universal authorization card system of claim 6, wherein the computer readable media comprises a CD-ROM, and wherein the adapter interfaces the card with a CD-ROM drive.

8. The computer readable universal authorization card system of claim 6, wherein the card further comprises a card aperture translated off center of the card and wherein the adapter further comprises an adapter aperture overlapping with the card aperture for interfacing the card with a media reader.

9. The computer readable universal authorization card system of claim 6, wherein the recess is translated off center of the adapter.

10. The computer readable universal authorization card system of claim 6, wherein total thickness of the adapter in a second non-recessed portion of the adapter ranges from about 1.3 to about 1.7 millimeters.

11. The computer readable universal authorization card system of claim 1, wherein the computer readable media comprises cardholder data.

12. The computer readable universal authorization card system of claim 11, wherein the cardholder data is encrypted.

13. The computer readable universal authorization card system of claim 11, wherein the cardholder data comprises a cardholder account number.

14. The computer readable universal authorization card system of claim 11, wherein the computer readable media further comprises an authorization program stored in the computer readable media that enables remote access to the computer readable media.

15. The computer readable universal authorization card system of claim 1, further comprising cardholder data encoded in the magnetic stripe.

16. The computer readable universal authorization card system of claim 1, wherein at least the first portion of the adapter is optically transparent.

17. The computer readable universal authorization card system of claim 1, wherein thickness of the card is approximately equal to depth of the recess.

18. The computer readable universal authorization card system of claim 1, wherein thickness of the card ranges from about 0.7 to about 0.95 millimeter.

19. The computer readable universal authorization card system of claim 1, wherein thickness of the card is about 0.78 millimeter.

20. A computer readable universal authorization card comprising:
a card having a card length and a card width;
computer readable media disposed on a first side of the card and for conducting communications over a global network; and
a magnetic stripe on a second side of the card and for interfacing with card readers,
wherein the magnetic stripe has a stripe length and a stripe width, and
wherein the stripe length is shorter than the card length.

21. The computer readable universal authorization card of claim 20, wherein the stripe width is shorter than the card width.

22. The computer readable universal authorization card of claim 21, wherein one end of the magnetic stripe is at least about 10 millimeters from one end of the card and one side of the magnetic stripe is at least about 4 millimeters from one side of the card.

23. The computer readable universal authorization card of claim 20, wherein one end of the magnetic stripe is at least about 10 millimeters from one end of the card.

24. The computer readable universal authorization card of claim 23, wherein another end of the magnetic stripe opposite to the one end of the magnetic stripe is at least about 10 millimeters from another end of the card opposite to the one end of the card.

25. A system for facilitating online transactions comprising:
a computer readable universal authorization card having a card length and a card width and comprising:
computer readable media on a first side of the computer universal authorization card, and
a magnetic stripe on a second side of the computer universal authorization card and having a stripe length and a stripe width, the stripe length being shorter than the card length; and
a cardholder computing system comprising a local computing device having a media reader for reading the computer readable media on the first side of the computer universal authorization card and for enabling a merchant computing device to remotely access and read data stored in the computer readable media via a global network, the merchant computing device being adapted to communicate the read data to an issuing institution computing device via another network,
wherein the issuing institution computing device is adapted to read the communicated data and to query a holder of the computer readable universal authorization card for an access code assigned to the computer readable universal authorization card, and
wherein the issuing institution computing device is adapted to authorize a transaction upon verification of the access code.

26. The system of claim 25, wherein the issuing institution computing device is further adapted to restrict the transaction unless the access code has been verified.

27. The system of claim 25, further comprising an acquiring institution computing device contemporaneously connected to the another network, wherein the merchant computing device is adapted to transmit the data stored in the computer readable media to the issuing institution computing device via the acquiring institution computing device.

28. The system of claim 27, wherein the data stored in computer readable media is encrypted, and wherein the encrypted data is decrypted only at the issuing institution computing device.

29. The system of claim 25, wherein the data stored in computer readable media is encrypted, and wherein the encrypted data is decrypted only at the issuing institution computing device.

30. The system of claim 25, wherein the stripe width is shorter than the card width.

31. The system of claim 30, wherein one end of the magnetic stripe is at least about 10 millimeters from one end of the card and one side of the magnetic stripe is at least about 4 millimeters from one side of the card.

* * * * *